Jan. 20, 1959
D. W. MURPHY
2,869,523
EJECTOR RELEASE MECHANISM FOR AUXILIARY
FUEL TANKS, AND THE LIKE
Filed Feb. 3, 1954
3 Sheets-Sheet 2
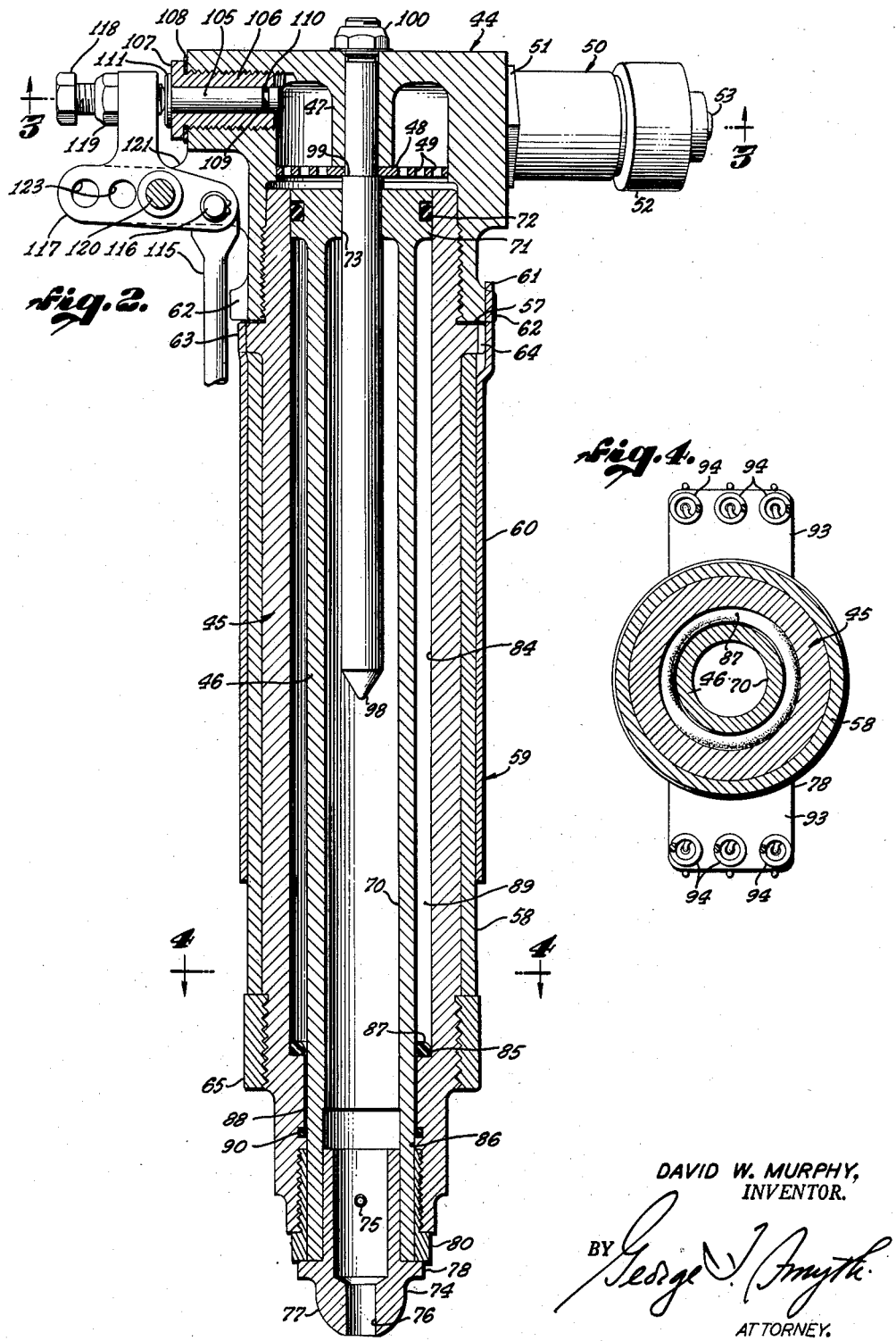
DAVID W. MURPHY,
INVENTOR.
BY George J. Smyth
ATTORNEY.

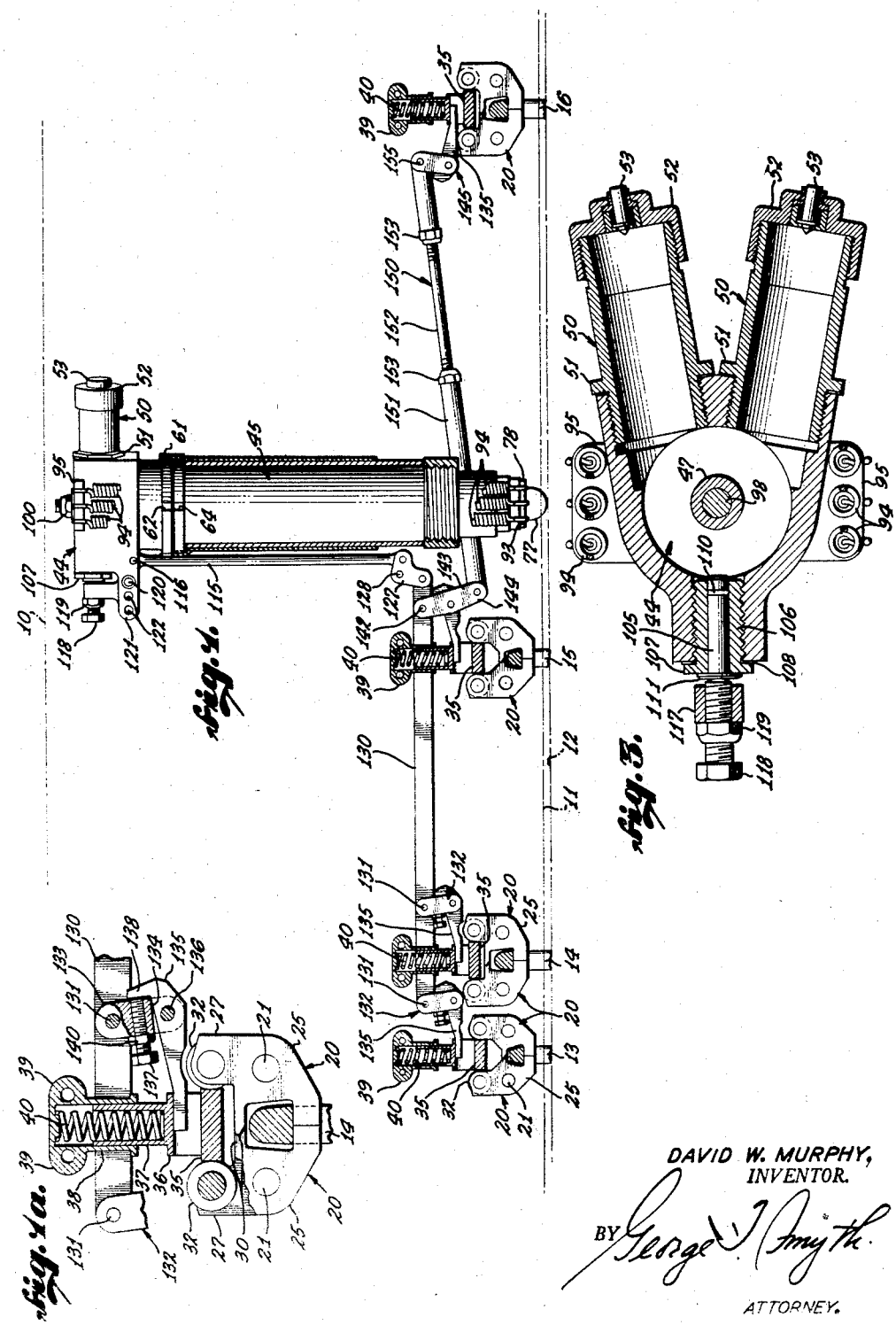

Jan. 20, 1959
D. W. MURPHY
2,869,523
EJECTOR RELEASE MECHANISM FOR AUXILIARY
FUEL TANKS, AND THE LIKE
Filed Feb. 3, 1954
3 Sheets-Sheet 3
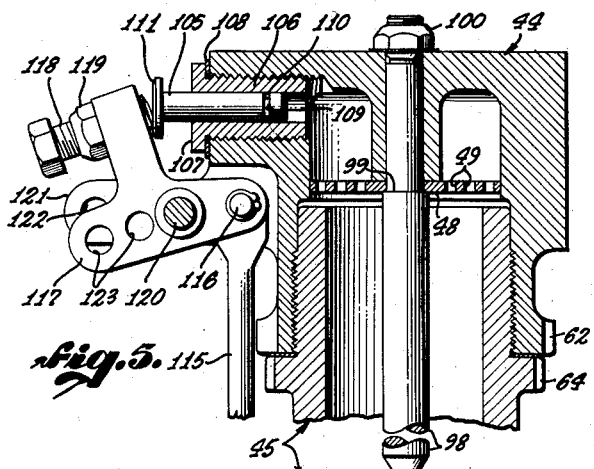
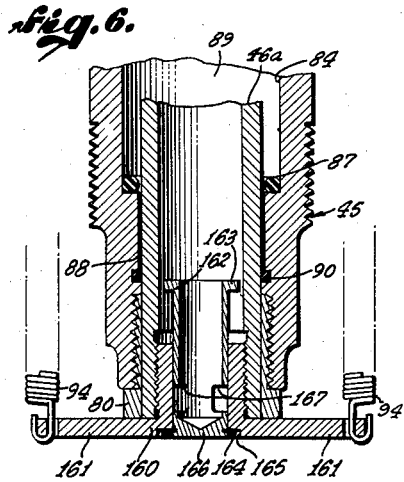
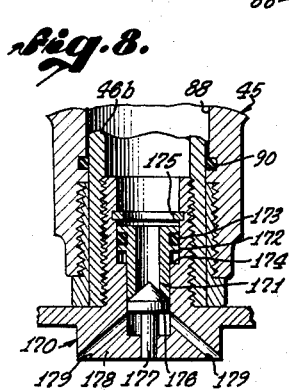
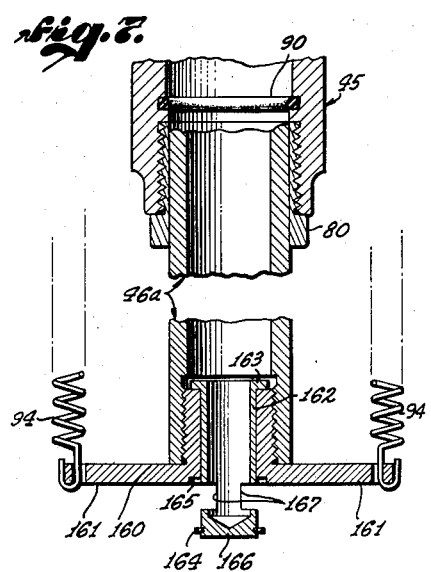
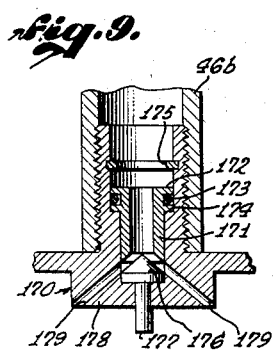
DAVID W. MURPHY,
INVENTOR.
BY George J. Smyth.
ATTORNEY.

United States Patent Office 2,869,523
Patented Jan. 20, 1959

2,869,523

**EJECTOR RELEASE MECHANISM FOR AUX-
ILIARY FUEL TANKS, AND THE LIKE**

David W. Murphy, Torrance, Calif., assignor to Pastushin
Aviation Corporation, Los Angeles, Calif., a corporation Application February 3, 1954, Serial No. 407,991

1 Claim. (Cl. 123—24)

This invention relates to means on an aircraft for releasably mounting an external store such as a jettisonable fuel tank or other body, and for ejecting the body from the aircraft with force created by abruptly rising fluid pressure.

In a typical arrangement for this purpose, the steep-front pressure rise is created by detonating an explosive charge to generate gases in a combustion chamber. A small cylinder in communication with the combustion chamber houses a small piston to provide force for unlatching the jettisonable body and a larger outwardly directed power cylinder in communication with the combustion chamber houses a power piston to apply the desired ejective force against the body, the piston being jettisoned along with the body.

A major improvement afforded by the present invention is the retention and retraction of the power piston at the end of the pressure-actuated ejection stroke. For this purpose, suitable stop means is provided to limit the outward power movement of the piston and suitable yielding means in the form of a plurality of coil springs is provided to retract the extended piston.

In providing this improvement, the invention successfully copes with two troublesome problems. One of these problems is to terminate the activating fluid pressure against the outwardly moving piston immediately after the ejective thrust has been delivered thereby to permit the piston to be returned to its normal retracted position. The other problem is to decelerate the rapidly moving piston to prevent destructive impact forces at the outer limit position of the piston.

The first problem of releasing the fluid pressure behind the outwardly moving piston is solved by various valve arrangements in various practices of the invention. In one practice a release valve is provided by using a piston having a relief passage for the trapped gases together with a stationary valve member that extends into the piston to close the piston passage at the normal retracted position of the piston. The stationary longitudinal valve member is short relative to the range of movement of the piston so that the piston moves away from the stationary valve member to open the relief passage as the piston approaches its outer limit position.

In other practices of the invention, a hollow piston is employed with a valve means at the outer end of the piston that is adapted to open in response to fluid pressure in the power cylinder but is normally prevented from opening by abutment against the latched fuel tank. A feature of one of these further practices of the invention is the provision of such a valve means in which sealing pressure is created by the confined gases as long as the outer end of the power piston is in contact with the fuel tank.

The second problem of avoiding destructive impact forces is solved by suitable shock absorber means. For this purpose a stop means to limit outward movement of the piston may be provided with a resilient cushioning means such as a rubber-like bumper. A feature of the preferred practice of the invention is the provision of an air cushion for the same purpose. The air cushion comprises an annular space between the piston and the surrounding power cylinder with one end of the annular space closed by sealing means carried by the power cylinder and the other end closed by sealing means carried by the piston.

Another improvement provided by the invention is an arrangement which makes possible close synchronization of the release actions of a plurality of latch means that normally hold the tank on the airplane, the arrangement also making possible any desired time relation between the steep-front pressure rise of the actuating fluid and the release action of the plurality of latches. In this regard, the invention contemplates a single actuating means powered by the small piston in combination with a plurality of means operatively connecting the actuating means with the plurality of latches respectively, at least all but one of these connecting means being adjustable for the purpose of synchronization. To permit variation in the timing of the release of the plurality of latch means, an additional adjustable means operatively connects the piston with the single actuating means.

A feature of the preferred practice of the invention is that the arrangement of the mechanism for latching and ejecting the jettisonable fuel tank is such as to fit readily into the pylon on the under side of the aircraft, the components being arranged to avoid interference with the internal structure of the pylon. In this regard, the invention is characterized by a release mechanism that extends downwardly in a position closely adjacent the power cylinder, the release mechanism extending along the power cylinder from the upper region of the interior of the pylon to the region of the under side of the pylon. The various latches for releasably attaching the fuel tank to the pylon are adjacent the under side of the pylon and the release mechanism extends laterally from the lower end of the power cylinder to the various latches. Thus, the mechanism for holding and releasing the jettisonable fuel tank is confined to the vertical region in the pylon of the downwardly extending power cylinder and the lower horizontal region in the pylon.

A further feature of the preferred practice of the invention is the provision of adjustability with respect to the normal retracted position of the piston. For this purpose, adjustable stop means limits the inward movement of the piston and this adjustable stop means is manipulated as required to bring the outer end of the piston into desirable pressure contact with the latched fuel tank.

The various features and advantages of the invention may be readily understood from the following description considered with the accompanying drawings.

In the drawings, which are to be regarded as merely illustrative:

Figure 1 is a view, partly in section and partly in side elevation, showing the essential components of a selected embodiment of the invention;

Figure 1a is an enlarged sectional detail of a portion of Figure 1;

Figure 2 is an enlarged vertical section showing the construction of the power cylinder and associated components;

Figure 3 is a transverse section taken as indicated by the line 3—3 of Figure 2;

Figure 4 is a transverse section taken as indicated by the line 4—4 of Figure 2;

Figure 5 is a fragmentary sectional view similar to Figure 2 showing positions of the parts immediately after the fuel tank has been ejected;

Figure 6 is a fragmentary sectional view of a modification of the invention;

Figure 7 is a view similar to Figure 6 showing the piston at the end of its outward movement;

Figure 8 is a fragmentary sectional view of another modification of the invention showing a valve in the leading end of the piston; and Figure 9 is a view similar to Figure 8 showing the valve in open position.

By way of illustration, the drawings show how an auxiliary fuel tank may be mounted on the under side of the wing of an aircraft by mechanism housed in the usual pylon. In Figure 1, the broken line 10 represents the upper side of the pylon, i. e., the juncture between the pylon and the under side of the wing of the aircraft, the broken line 11 represents the under side of the pylon, and the broken line 12 represents the upper side of a fuel tank having a series of spaced shackle loops 13, 14, 15, and 16. In a well known manner, the bottom of the pylon is closed by a bottom wall (not shown) that is apertured to receive the various shackle loops, as well as to clear the power piston for ejecting the fuel tank. Usually additional stabilizing means (not shown) is provided on the under side of the pylon for contact with laterally spaced points of the fuel tank in a well known manner.

The latch means inside the pylon for releasable engagement with the four shackle loops of the fuel tank 12 may comprise respectively four pairs of rotary hook members 20 journaled on corresponding pairs of cross rods 21. Each of the hook members 20 may be in the form of a lever having a lower arm 25 terminating in a hook end and having an upwardly extending arm 27 which may be termed the locking arm of the hook member. In addition, the two hook members 20 of each pair may be formed with coacting fingers 30 which may be termed cocking fingers since they serve the purpose of automatically setting the latch mechanisms when the shackle loops of the fuel tank are thrust upward to their engagement positions shown in Figure 1. The two cocking fingers 30 of each pair of hook members overlap when the two hook members are in the closed positions shown in Figure 1.

It is contemplated that the rotary hook members 20 will be constructed with a tendency to snap open in response to weight carried thereby and that suitable means will be provided to block such release action until the moment the fuel tank is to be jettisoned. In the present construction, the two locking arms 27 of each pair of rotary hook members 20 is of forked construction to journal a corresponding pair of rollers 32. The locking means to block release operation of each pair of rotary hook members 20 may comprise a small locking block 35 which is normally positioned between the two locking arms 27 in abutment with the pair of rollers 32, as shown in Figure 1. It is apparent that since the hook ends of the lower arms 25 of the rotary hook members 20 are offset laterally from the pivot axes of the hook members, the weight of the fuel tank 12 imposed on the various hook members by the various shackle loops will tend to rotate the hook members to open position for release of the fuel tank, but that the various locking blocks 35 normally prevent such release operation.

Each of the locking blocks 35 is carried by a suitable yoke 36 having an upwardly extending tubular shank 37. The tubular shank 37 is slidingly telescoped into a tubular bracket member 38 having a pair of ears 39 for rigid anchorage inside the pylon. A suitable coil spring 40 confined in compression in the tubular shank 37 urges the locking block 35 downward towards its normal locking position.

It is apparent that the four pairs of rotary hook members 20 may be caused to be snapped open simply by retracting the four corresponding locking blocks 35 upward in opposition to the concealed springs 40 thereby permitting the rotary hook members 20 to respond to the weight of the fuel tank.

The required explosion-actuated means for creating the force for ejecting the auxiliary fuel tank 12 may comprise a combustion chamber 44, a power cylinder 45 in communication therewith and a power piston 46 in the power cylinder. The cylinder and piston together form what may be termed a main expansion chamber. In the construction shown, the combustion chamber 44 is in the form of a hollow casting having an inner axial boss 47 on which is mounted a suitable baffle plate 48 that separates the interior of the combustion chamber from the interior of the power cylinder. The baffle plate 48 has a plurality of perforations 49 small enough to hold back grains of the explosive material. A pair of nipple fittings 50, having hexagonal flanges 51, are threaded into one side of the combustion chamber to hold explosive charges in the form of cartridges (not shown) and each of the nipple fittings is closed by a special cap 52. Each of the special caps 52 carries an insulated firing contact 53 controlled by the usual firing circuit (not shown).

The power cylinder 45 threads into the combustion chamber 44 with the joint sealed by a suitable gasket 57 and this assembly is inserted into a fixed metal shell 59 of the pylon structure. An outer sleeve 60, united with the fixed metal shell 58, has at least one upward tongue 61 that extends between two successive lugs 62 on the periphery of the combustion chamber and also has at least one upward tongue 63 that extends between two successive lugs 64 on the periphery of the power cylinder 45. The tongues 61 and 63 fix the rotary position of the assembly as well as prevent relative rotation between the combustion chamber and the power cylinder. A suitable spanner nut 65 on the lower end of the power cylinder, abuts the lower end of the fixed metal shell 58 to anchor the assembly against vertical movement.

The power piston 46 may be of tubular construction to provide a passage 70 for the escape of gases from the power cylinder after the piston has exerted the required ejective force against the fuel tank 12. The upper end of the piston is formed with an enlargement 71 that is grooved to carry a sealing ring 72 and this enlargement has an axial valve port 73 for communication between the interior of the power cylinder 45 and the interior of the piston.

The lower end of the piston is provided with a hollow end fitting 74 that telescopes into the piston and is secured by suitable pin means 75. The end fitting 74 has an axial discharge port 76 and may be formed with a rounded nose 77. The end fitting 74 is also formed with a radial flange 78 which abuts an adjustment bushing 80 that is threaded into the lower end of the power cylinder 45. The bushing 80, co-operating with the radial flange 78 of the end fitting 74 serves as an adjustable stop to limit the upward movement of the piston. It is apparent that the bushing 80 may be rotated to vary the normal retracted position of the power piston 46 so that the power piston may be adjusted for close contact with the fuel tank 12 when the fuel tank is secured by the four shackles 13–16.

The power cylinder 45 has an inner cylindrical wall 84 extending throughout the major portion of its length to co-operate with the piston enlargement 71 and is reduced in inner diameter at its lower end to form a stop shoulder 85 and to form an inner cylindrical wall 86 to embrace the piston 46 below the piston enlargement 71. It is apparent that the stop shoulder 85 will co-operate with the piston enlargement 71 to limit the downward power movement of the piston and a feature of the invention in this regard is the provision of suitable shock absorbing means adjacent the stop shoulder 85 to receive the impact of the downwardly moving piston. In this instance, the shock absorbing means is a resilient rubber-like ring 87 which may be a standard O-ring.

A further feature of the preferred practice of the invention is the provision of an air cushion to serve as further means for decelerating the piston as it approaches its lower limit position. For this purpose, the power cylinder 45 is dimensioned to form an annular space 88 around the power piston, this annular space being in communication with the larger annular space 89 above the stop shoulder 85. The two annular spaces 88 and 89 may be considered as a single annular space or an auxiliary chamber of variable axial dimension which is closed at the upper end by the sealing ring 72 on the piston enlargement 71 and is closed at its lower end by a stationary sealing ring 90 carried by the power cylinder in snug contact with the power piston. Thus, it is apparent that as the piston enlargement 71 approaches the shock absorbing ring 87, the air trapped in the annular space around the piston will be greatly compressed to offer progressively increasing resistance to the downward movement of the piston.

It is contemplated that suitable yielding means will be provided to return the power piston 46 to its upper normal retracted position after the power piston has exerted its downward thrust for ejection of the fuel tank 12. For this purpose, the radial flange 78 at the lower end of the piston may be extended to form lateral wings 93 (Figure 4) to provide anchorage for the lower ends of a plurality of coil springs 94 and the combustion chamber 44 may be formed with corresponding lateral wings 95 (Figure 3) to anchor the upper ends of the springs.

It is contemplated that the passage 70 in the power piston 46 will be closed to prevent escape of the high pressure gases during the initial power thrust of the piston against the fuel tank, but will be open thereafter to permit release of the gases as the piston approaches its limit position of extension. For this purpose, a valve member in the form of a cylindrical rod 98 extends downward from the inner end of the power cylinder 45 to close the axial valve port 73 at the inner end of the piston. The effective length of the valve member 98 corresponds to the proportion of the travel of the power piston, during which the power piston is to be actuated by the confined gases.

In the construction shown, the elongated valve member 98 is reduced in diameter at its upper end to form a shoulder 99 for abutment against the baffle plate 48 so that the valve member may serve the additional function of holding the baffle plate in assembled position. The reduced upper end of the valve member 98 extends through the axial boss 47 of the combustion chamber and carries a retaining nut 100 at its outer end in abutment with the external surface of the combustion chamber.

Normally, the power piston 46 is in its upper retracted position shown in Figure 2 with the rounded nose 77 of the piston in contact with the surface of the fuel tank 12. When the explosive charges in the nipple fittings 50 are detonated for the rapid generation of gases inside the combustion chamber 44, the high pressure gases passing through the perforations 49 of the baffle plate 48 enter the power cylinder 45 and expand to force the power piston downward. The generated gases are confined to exert pressure against the downwardly moving piston until the piston enlargement 71 clears the stationary valve member 98 as shown in Figure 5 thereby opening the axial valve port 73 to permit release of the gases. The gases are discharged through the valve port 73, passage 70, and the discharge port 76 at the outer end of the piston.

The piston continues to move with high momentum after the internal gas pressure drops, but the piston is effectively decelerated by the action of the coil springs 94 and the resistance of the previously described air cushion, final deceleration of the piston being accomplished by the shock absorbing ring 87. With the piston brought to a stop, the coil springs 94 exert sufficient force to return the piston upward to its normal retracted position.

Any suitable arrangement may be provided to cause the four pair of rotary hook members 20 to open for release of the fuel tank 12 in proper time relation to the downward thrust of the power piston 46 against the fuel tank. In this embodiment of the invention, a small auxiliary piston 105 is provided in communication with the combustion chamber 44. As shown in Figures 2, 3, and 5, the auxiliary piston 105 is mounted in an auxiliary cylinder 106 which is a tubular member that threads into the wall of the combustion chamber. The tubular member has an end flange 107 to retain a suitable sealing gasket 108. The auxiliary piston itself is a cylindrical body having a circumferential groove 109 to retain a sealing ring 110 and preferably the cylindrical body is provided with a circular head or radial flange 111 on its outer end.

A feature of the present embodiment of the invention is the use of an actuating means 115 in the form of a rod extending downward closely adjacent to the power cylinder 45 longitudinally thereof for transmitting actuating force from the auxiliary piston 105 to the four locking blocks 35 that normally hold the four pairs of rotary hook members 20 in closed position. As best shown in Figures 2 and 5, the actuating rod 115 is connected by a pin 116 with one arm of a bell crank 117 and a second arm of the bell crank carries a screw 118 for abutment against the head of the auxiliary piston 105. The screw 118 may be adjusted axially as desired and may be locked in any given position of adjustment by a suitable locking nut 119.

The bell crank 117 is rotatably mounted on a pivot member 120 that is carried by a pair of ears 121 integral with the combustion chamber 44. The pair of ears 121 have spaced apertures 122, in this instance three apertures, in which the pivot member 120 may be mounted selectively, and in like manner, the bell crank 117 has spaced apertures 123 to receive the pivot member 120 selectively. This arrangement permits the pivot member to be shifted among the apertures 122 and 123 to vary the effective length of the two arms of the bell crank and thus to vary the mechanical advantage in the transmission of force afforded by the bell crank. Varying the mechanical advantage varies the sensitivity of response of the actuating rod 115 to the outward movement of the auxiliary piston 105 and, of course, varies the timing of the movement of the actuating rod, relative to the rise of pressure in the combustion chamber 44 when an explosive charge is detonated.

The lower end of the actuating rod 115 is operatively connected to a series of four bell cranks corresponding to the four pairs of rotary hook members 20 for lifting the corresponding locking blocks 35. It is contemplated that at least all but one of the four bell cranks will be adjustable with respect to its response to the actuating rod 115 to permit the opening operation of the four pairs of rotary hook members 20 to be closely synchronized. As best shown in Figure 1, the lower end of the actuating rod 115 may be pivotally connected to one arm of a bell crank 127 that is mounted on a pivot 128 and the other arm of the bell crank 127 may be connected to a substantially horizontal operating bar 130. For releasing the two pairs of rotary hook members 20 that engage the two fuel tank shackles 13 and 14, the operating bar 130 may be connected by pins 131 to two bell cranks 132 respectively, each of which bell cranks is of the adjustable construction shown in Figure 1a.

Each of the two bell cranks 132 has one arm in the form of a link 133 that is suspended on the corresponding pin 131 and is formed with a slot 134 to receive a lever 135 that forms the second arm of the bell crank. Both the link 133 and the lever 135 are mounted on a fixed pivot 136 which constitutes the pivot of the adjustable bell crank. The link 133 is provided with a suitable screw 137 that abuts against a laterally extending end 138 of the lever 135 and a suitable lock nut 140 is provided to immobilize the screw 137 at selected positions of adjustment. The other end of the lever 135 which constitutes the second arm of the adjustable bell crank extends into the yoke 36 of the corresponding locking block 35, so that clockwise rotation of the bell crank as viewed in the drawings, will cause the locking block to be lifted sufficiently to permit the opening action of the corresponding pair of rotary hook members 20. It is apparent that adjustment of the screw 137 in each of the bell cranks 132 varies the angle between the two arms of the bell crank and thereby varies the timing of the release operation of the corresponding pair of hook members 20 relative to the timing of the longitudinal movement of the operating bar 130.

The operating bar 130 is connected by a pivot pin 142 to one arm of a third bell crank 143 for operating the third pair of rotary hook members 20 that normally engage the third shackle loop 15 of the fuel tank. The bell crank 143 is of the same general construction as the two bell cranks 132 but does not have an adjustment screw 137, since provision for adjustment may be omitted with reference to one of the four pairs of rotary hook members. The bell crank 143 has a downwardly extending third arm 144 which is operatively connected to a fourth bell crank 145 by an adjustable connecting means generally designated 150.

The adjustable connecting means 150 comprises two tube members 151 and an intermediate rod 152 having threaded ends. Suitable nuts 153 are mounted on the opposite ends of the rod 152 in abutment with the corresponding ends of the tube members 151. It is apparent that the two nuts 153 may be rotated to vary the effective length of the adjustable connecting means 150 thereby to vary the time relation of the opening operation of the fourth pair of rotary hook members relative to the operation of the operating bar 130.

Since adjustability is built into the connecting means 150, it is not necessary to provide adjustability in the construction of the fourth bell crank 145. The fourth bell crank 145, that controls the opening operation of the fourth pair of rotary hook members for the fourth shackle loop 16, is connected to the connecting means 150 by a suitable pin 155 and is of the same general construction as the two bell cranks 132 except for the omission of an adjustment screw 137.

It is apparent that the four pairs of rotary hook members 20 may be synchronized with respect to their opening operation by adjustment of the adjustment screws 137 in the two bell cranks 132 and adjustment of the nuts 153 in the connecting means 150 that actuates the fourth bell crank 145. It is also apparent that the timing of the simultaneous opening operation of the four pairs of rotary hook members 20 may be adjusted relative to the rise in pressure of the explosion gases by adjustment of the bell crank 117 at the upper end of the actuating rod 115.

To release the auxiliary fuel tank 12 in the course of flight, it is merely necessary to close the firing circuit to detonate the two charges for the rapid generation of gases in the combustion chamber 44. The gases generated by the rapidly burning explosive material causes pressure in the combustion chamber and in the upper end of the power cylinder 45 to rise abruptly to a high magnitude. As a consequence, the downward thrust of the power piston 46 against the fuel tank increases rapidly to create the desired ejection force. In the meantime, the auxiliary piston 105 moves outward in response to the rising pressure and thereby moves the actuating rod 115 to lift the four locking blocks 35 simultaneously for simultaneous opening movement of the four pairs of rotary hook members 20.

As the power piston 46 moves downward, the valve port 73 carried by the piston moves beyond the end of the elongated valve member 98 and the high pressure gases are free to escape through the passage 70 in the piston to the atmosphere. The resistance of the four coil springs 94 and the resistance of the previously described air cushion slow down the piston and the piston is brought to a final stop by the shock absorbing ring 86. The plurality of coil springs 94 then return the power piston to its normal upper retracted position.

To prepare for a subsequent operation of the mechanism on a subsequent flight, it is merely necessary to insert fresh cartridges into the nipple fittings 50 of the combustion chamber. To mount a new fuel tank with the four pairs of rotary hook members in their open positions, it is merely necessary to maneuver the fuel tank upward for insertion of the four shackle loops 13, 14, 15, and 16 into the corresponding pairs of rotary hook members. The upward movement of the shackle loops against the cocking fingers 30 causes the rotary hook members to rotate to their open position and thus permits the four locking blocks 35 to be moved downward into their blocking positions by virtue of the pressure exerted by the four concealed springs 40.

Figures 6 and 7 illustrates a modification that may be made at the lower end of the power piston 46. The modified power piston 46a is internally threaded at its lower end to receive a threaded tubular end member 160 that is provided with the usual lateral wings 161 for connection to the lower ends of the coil springs 94. Slidingly mounted inside the tubular end member 160 is a suitable valve element in the form of a valve sleeve 162 which has a radial flange 163 on its inner end for abutment with the inner end of the tubular member 160 to limit the outward movement of the valve sleeve. The other outer end of the valve sleeve 162 carries a split retaining ring 164 that normally seats in an annular recess 165 in the tubular end member 160 to limit the upward movement of the valve sleeve at the normal retracted position of the valve sleeve. The valve sleeve 162 has an end wall 166 closing its outer end and adjacent thereto has a pair of peripheral apertures 167. The apertures 167 are normally cut off from the atmosphere in the normal retracted position of the valve sleeve shown in Figure 6 and are exposed to the atmosphere at the extended position of the valve shown in Figure 7.

It is contemplated that the valve member in the form of the valve sleeve 162 will normally be in abutment with the shackled fuel tank and therefore will normally be held closed by the fuel tank. When the explosive charge is detonated to create gas pressure for downward movement of the power piston 46a, the valve sleeve 162 is initially maintained in closed position by contact with the fuel tank. When the fuel tank has been unlatched and then ejected by the thrust of the piston and has moved away from the piston, the fluid pressure inside the piston will force the valve sleeve 162 outward to the open position shown in Figure 7 for release of the trapped gases. Thus, the thrust against the piston is terminated automatically and then the piston is decelerated and returned to its normal position automatically as heretofore described.

Figures 8 and 9 illustrate another construction that may be used for the lower outer end of the power piston. In this construction, the lower end of the power piston 46b is internally threaded to receive a threaded tubular end member 170 in which is slidingly mounted a valve element in the form of a valve sleeve 171. The valve sleeve 171 has a radial enlargement 172 at its inner end and is provided with a sealing ring 173. The downward movement of the valve sleeve 171 is limited by abutment of the enlargement 172 against an internal circumferential shoulder 174 and the upward movement is limited by a split stop ring 175 mounted inside the end member 170.

The lower end of the valve sleeve 171 forms a seat for a second valve element in the form of a conical valve member 176 that has an axial stem 177. The axial stem 177 extends through the end wall 178 of the end member 170 and is normally in contact with the latched fuel tank. The latched fuel tank holds the valve member 176 in the elevated position shown in Figure 8 and thereby holds the valve sleeve 171 in elevated position. After the piston 46b exerts an effective thrust against the released fuel tank and the released fuel tank moves away from the end of the piston, the gas pressure inside the piston causes both the valve sleeve 171 and the valve member 176 to move downward to their limit positions shown in Figure 9. In Figure 9, it will be noted that the valve member 176 has traveled further than the valve sleeve 171 to form a gap between the valve member and the sleeve, which gap permits the trapped gases to escape through diagonal escape passages 179. A feature of this particular modification of the invention is that during the power thrust of the piston against the fuel tank and prior to the formation of a gap between the fuel tank and the piston, the pressure of the confined gases acting upon the inner end of the valve sleeve 171 causes the valve sleeve to exert sealing pressure against the conical valve member 176.

My description in specific detail of selected embodiments of the invention will suggest to those skilled in the art, various changes, substitutions and other departures from my disclosure that properly lie within the scope and spirit of the appended claims.

I claim:

In a combination for ejecting a body from an aircraft: a power cylinder for communication with a source of high pressure actuating fluid, said power cylinder having an outer open end; a power piston mounted in said cylinder for limited outward movement to exert thrust against said body, said piston being of tubular construction to provide a passage therethrough for the escape of fluid from the interior of said cylinder; and a stationary longitudinal valve member carried by said cylinder and extending into the tubular piston to normally close said passage, said stationary valve member being short relative to the range of movement of said piston to open said passage for escape of said fluid before the piston reaches its outer limit position.

References Cited in the file of this patent

UNITED STATES PATENTS

| | | |
|---|---|---|
| 271,060 | Graham | Jan. 23, 1883 |
| 1,264,318 | McGrath | Apr. 30, 1918 |
| 1,512,333 | Harberson | Oct. 21, 1924 |
| 1,598,476 | Cribier | Aug. 31, 1926 |
| 2,128,584 | Haage | Aug. 30, 1938 |
| 2,402,335 | Mayer | June 18, 1946 |
| 2,421,807 | Richey et al. | June 10, 1947 |
| 2,466,980 | Bronson | Apr. 12, 1949 |
| 2,541,087 | Musser | Feb. 13, 1951 |
| 2,591,913 | Bowers et al. | Apr. 8, 1952 |
| 2,687,776 | Baker | Aug. 31, 1954 |
| 2,736,522 | Wilson | Feb. 28, 1956 |

FOREIGN PATENTS

| | | |
|---|---|---|
| 54,131 | Denmark | Jan. 3, 1934 |
| 169,919 | Switzerland | Sept. 1, 1934 |
| 454,152 | Great Britain | Sept. 21, 1936 |
| 488,549 | Great Britain | July 11, 1938 |
| 609,456 | Great Britain | Sept. 30, 1948 |